Patented Mar. 22, 1949

2,464,851

UNITED STATES PATENT OFFICE 2,464,851

METHOD OF PREVENTING THE BLACKENING OF GLASS BY MERCURY VAPOR

James K. Davis, Corning, N. Y., assignor to Corning Glass Works, Corning, N. Y., a corporation of New York No Drawing. Application February 4, 1944, Serial No. 521,133

4 Claims. (Cl. 49—77)

This invention relates to treatments of glass for improving its chemical and physical characteristics. More particularly, it relates to the treatment of glasses consisting of silica, boric oxide, alkali oxide and alumina, the boric oxide content being from about 15% to about 40%.

Such glasses are particularly valuable for use in low pressure mercury arc lamps for producing short wave ultra-violet radiations because, when made of commercial materials of high quality, these glasses have an unusually high transmission for the germicidal wave length 254 m$\mu$. For this purpose the glasses are usually fabricated into tubes which are subsequently formed into tubular enclosures for the lamps.

Considerable difficulty has been encountered in the use of such lamps, due to the tendency of the tube to become blackened on its interior surface by contact with mercury vapor during use. The transmission of the glass for wave length 254 m$\mu$ and below is thereby seriously diminished or entirely destroyed.

The physical and chemical reactions involved in the blackening of such glasses by the mercury arc are not clearly understood. However, it is now known that these glasses, when fabricated into tubing, have a certain instability when freshly fabricated whereby they are affected by the normal humidity of the atmosphere. Such attack or weathering is usually invisible, but in extreme cases it sometimes becomes visible as a growth of minute crystals of boric acid on the interior surface of the tubes. Although the tendency for the freshly fabricated glass to blacken in the mercury arc varies somewhat with the composition, a given glass when substantially weathered will blacken more severely than the same glass when freshly fabricated.

An object of this invention is to prevent the surfaces of borosilicate glass from weathering or, in other words, to increase its surface stability.

Another object is to prevent the exudation or liberation of boric acid or boric oxide from the surfaces of borosilicate glass articles when exposed to atmospheres containing water vapor.

Another object is to produce improved glass envelopes or enclosures for mercury arcs.

Another object is to prevent internal blackening of mercury arc enclosures composed of borosilicate glass.

Another object is to increase the blackening resistance of a borosilicate glass beyond that inherently possessed by the glass when initially fabricated.

I have now discovered a method by means of which not only can the stability of the glass be improved so that it is considerably more resistant to subsequent weathering, but its blackening resistance is thereby increased beyond that which the glass inherently possesses when freshly fabricated. My new method comprises weathering the glass or treating it with water at a temperature of about 20° to about 80° C. and thereafter heating the treated glass for a few minutes at a temperature substantially above its annealing point and preferably at the highest temperature possible without distorting it. Annealing and softening points are defined in an article entitled: "Viscosity of glass between the strain point and melting temperature," by H. R. Lillie, Journal Am. Cer. Soc., vol. 14, p. 502 (1931).

Preferably, the treatment with water comprises exposing the glass to an atmosphere having a relative humidity of at least 25%. Alternatively, the glass may be soaked in liquid water. The time required for treatment will vary, depending upon the temperature and humidity and also to some extent upon the composition of the glass. The more unstable the original glass, the more susceptible it is to treatment and the shorter the time required at a given temperature and humidity. The time, therefore, may amount to as little as ten minutes when the temperature and humidity of the treatment is at the maximum or when liquid water is used, or it may amount to as much as several days or weeks at the lowest effective temperatures and humidities. For the more unstable glasses, storage in an exposed manner for several days or weeks during the hot, humid summer months is sufficient.

A properly weathered glass which is subsequently heated substantially above its annealing point will have a greater blackening resistance than the freshly fabricated glass and in general the blackening resistance will increase and the time required to obtain it will decrease as the heating temperature is increased. Preferably, the glass should be heated somewhat above its softening point, say at about 750° C. At this temperature five minutes heating is usually sufficient.

In order to prevent warping of the glass tubes while they are being heated in the neighborhood of their softening points, I have found it advantageous to support them above two spaced rolls of metal one of which is rotated.

The proper degree of weathering for my purpose may readily be determined by trial and by selecting preferably the weathering treatment which gives the glass the greatest chemical stability after being subsequently heat treated. For this purpose the acid stability is measured by determining the loss in weight in milligrams per square centimeter of surface of a sample of the glass after being immersed for thirty minutes in a 2% aqueous solution of hydrochloric acid at 100° C. The smaller the loss in weight, the greater the stability of the glass.

In order to determine the proper time of weathering for maximum stability at a particular humidity and temperature, a series of samples of the glass are subjected for varying times to the desired humidity and then are heated at the desired temperature after which their stabilities are measured. For best results, it is preferable to carry the weathering only to the point of maximum stability because further weathering soon initiates a decrease in the stability and in most cases also in the blackening resistance. By way of example, the following table shows the stabilities as loss in weight of a series of samples of one glass which were exposed to relative humidities of 50%, 75%, and 95%, respectively, at a temperature of about 50° C., and were then heated for five minutes at 750° C.

Table I

| Hours Exposed | Loss in weight | | |
|---|---|---|---|
| | mg./cm.² 50% RH | mg./cm.² 75% RH | mg./cm.² 95% RH |
| 0 | 0.241 | 0.241 | 0.241 |
| 1 | 0.228 | 0.236 | 0.055 |
| 4 | 0.097 | 0.027 | 0.020 |
| 16 | 0.010 | 0.016 | 0.038 |
| 64 | 0.005 | 0.024 | 0.251 |

Considering the above table, several facts appear. The temperature being constant, the time required to attain maximum stability is decreased as the relative humidity is increased. With a constant temperature and constant relative humidity the stability of the glass rapidly improves as the time of exposure is increased until a maximum stability is attained, after which further exposure causes a deterioration of the stability which at first is gradual but in time becomes more and more rapid, especially when the humidity is high. With very long exposures and very high relative humidities, for example, 64 hours at 95% RH as shown above, the stability depreciates to a value below that of the original glass and the blackening resistance also deteriorates.

In another patent application, Serial Number 412,888, filed September 29, 1941, by John L. Sheldon and assigned to the assignee of the present application, there is described a method for increasing the stability of borosilicate glasses and for preventing the internal blackening of mercury arc enclosures composed thereof. That method comprises weathering the glass by treating it for at least one hour with fluid water at a temperature not exceeding 100° F., and thereafter heating the glass for one to three hours near its annealing point. My new method differs from the prior method in that after weathering the glass I heat it at a temperature substantially above its annealing point.

My new method possesses several advantages over the prior method. It produces a greater blackening resistance which at its best averages about two and a half times greater than that of the prior method. I have further found that when the heat treating temperature is near the softening point of the glass, excessive weathering causes less deterioration of blackening resistance than when the heat treating temperature is near the annealing point. Because of this, the weathering conditions are less critical with my new method. This is important, because the slight variations which sometimes occur in successive melts of glass would otherwise require a corresponding variation in weathering treatment in order to reproduce the maximum blackening resistance. I have also found that a brief washing of the glass with water after the humidity treatment, but before the heat treatment, further increases the blackening resistance.

The following example shows the increased blackening resistance which is obtained by weathering the glass and thereafter heating it for a few minutes near its softening point as compared to weathering it and heating it only in the neighborhood of its annealing point. A series of six samples were prepared and tested as follows:

Six pieces of tubing each about three inches in length were exposed to a relative humidity of 90% at a temperature of 50° C. for 48 hours. Three of the weathered samples were thereafter heated at 450° C.; two of the others were heated at 750° C., and the sixth was washed with water, dried and heated at 750° C.

Three mercury arc lamps were then fabricated in the usual manner from straight tubes, each having a length and diameter sufficient to permit two of the above described samples to be inserted in their central portion so that the mercury arc could pass freely through the samples when the lamps were in operation. Into each lamp tube was introduced one of the samples which had been heated at 450° C. together with one of the samples which had been heated at 750° C. After baking out under vacuum in the usual manner, the three lamps were sealed and placed in operation under identical conditions and thus maintained in continuous operation for 2000 hours. At the end of this time the individual samples were removed and the percentage deterioration in transmission at 254 m$\mu$ due to blackening was determined for each as follows:

The transmission of the wall of each sample tube for wave length 254 m$\mu$ was measured. The surface layer of each sample tube including any discoloration was then removed by washing the glass with a 10% solution of hydrofluoric acid, after which the transmission of the wall of each sample tube for wave length 254 m$\mu$ was again measured. The difference in transmission for each sample before and after removal of the surface layer was divided by the transmission of the respective sample after said removal and the result multiplied by 100 was the percentage of deterioration due to blackening.

The following table shows the results:

Table II

| Treatment of Sample | Deterioration |
|---|---|
| | Percent |
| Lamp #1: | |
| Weathered and heated @ 450° C | 32 |
| Weathered and heated @ 750° C | 17 |
| Lamp #2: | |
| Weathered and heated @ 450° C | 34 |
| Weathered and heated @ 750° C | 18 |
| Lamp #3: | |
| Weathered and heated @ 450° C | 32 |
| Weathered, washed, and heated @ 750° C | 13 |

I claim:
1. The method of increasing the blackening resistance of alkali-alumina-borosilicate glasses containing from 15% to 40% $B_2O_3$, which consists in treating the glass for at least ten minutes with water in a fluid state at a temperature from about 20° C. to about 80° C. until the glass has attained substantially maximum chemical stability, and thereafter heating the glass for about five minutes at about 750° C.

2. The method of increasing the blackening resistance of alkali-alumina-borosilicate glasses containing from 15% to 40% $B_2O_3$, which consists in treating the glass for at least ten minutes with water vapor at a temperature from about 20° C. to about 80° C. and a relative humidity of at least 25% until the glass has attained substantially maximum chemical stability, and thereafter heating the glass for about five minutes at about 750° C.

3. The method of increasing the blackening resistance of alkali-alumina-borosilicate glasses containing from 15% to 40% $B_2O_3$, which consists in treating the glass for at least ten minutes in a warm humid atmosphere having a temperature from about 20° to about 80° C., and a relative humidity of at least 25% until the glass has attained substantially maximum chemical stability, and thereafter heating the glass for about five minutes at about 750° C.

4. The method of increasing the blackening resistance of alkali-alumina-borosilicate glasses containing from 15% to 40% $B_2O_3$, which consists in treating the glass for at least ten minutes with liquid water at a temperature from about 20° C. to about 80° C. until the glass has attained substantially maximum chemical stability, and thereafter heating the glass for about five minutes at about 750° C.

JAMES K. DAVIS.

REFERENCES CITED

The following references are of record in the file of this patent:

UNITED STATES PATENTS

| Number | Name | Date |
| --- | --- | --- |
| 2,286,275 | Hood et al. | June 16, 1942 |
| 2,295,626 | Beese | Sept. 15, 1942 |
| 2,396,741 | Jones et al. | Feb. 20, 1945 |
| 2,377,062 | Adams | May 29, 1945 |
| 2,433,928 | Sheldon | Jan. 6, 1948 |

FOREIGN PATENTS

| Number | Country | Date |
| --- | --- | --- |
| 428,329 | Great Britain | May 10, 1935 |